Figures 1, 2:
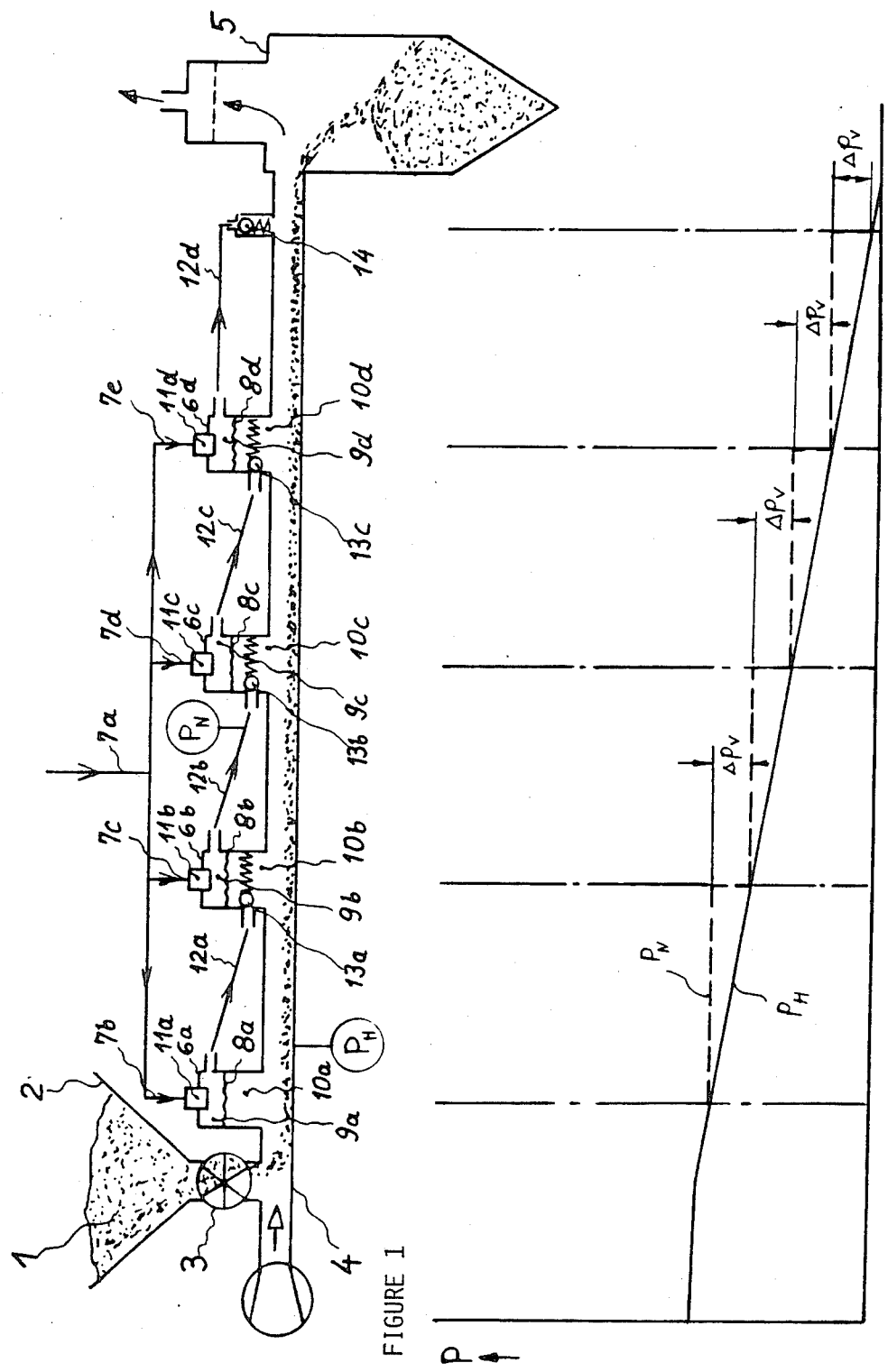

United States Patent [19]

Krambrock

[11] Patent Number: 4,715,748
[45] Date of Patent: Dec. 29, 1987

[54] PROCESS AND EQUIPMENT FOR PNEUMATIC AND HYDRAULIC TRANSPORT OF BULK MATERIALS THROUGH PIPES

[75] Inventor: Wolfgang Krambrock, Vogt, Fed. Rep. of Germany

[73] Assignee: AVT Anlagen- und Verfahrenstechnik GmbH, Vogt, Fed. Rep. of Germany

[21] Appl. No.: 35,264

[22] Filed: Apr. 6, 1987

Related U.S. Application Data

[63] Continuation of Ser. No. 781,135, Sep. 27, 1985, abandoned.

[30] Foreign Application Priority Data

Sep. 29, 1984 [DE] Fed. Rep. of Germany ....... 3435907

[51] Int. Cl.⁴ ............................................. B65G 53/66
[52] U.S. Cl. ........................................ 406/11; 406/14; 406/95
[58] Field of Search ...................... 406/11, 14, 15, 94, 406/95, 93

[56] References Cited

U.S. PATENT DOCUMENTS

| 4,067,622 | 1/1978 | Krambrock et al. | 406/94 X |
| 4,515,503 | 5/1985 | Snowdon | 406/11 |

FOREIGN PATENT DOCUMENTS

| 449393 | 9/1927 | Fed. Rep. of Germany . | |
| 1174256 | 7/1964 | Fed. Rep. of Germany . | |
| 1191741 | 4/1965 | Fed. Rep. of Germany . | |
| 2022962 | 11/1971 | Fed. Rep. of Germany . | |
| 2305030 | 8/1974 | Fed. Rep. of Germany . | |
| 2550164 | 5/1977 | Fed. Rep. of Germany . | |
| 212526 | 12/1983 | Japan | 406/94 |
| 18635 | 1/1986 | Japan | 406/95 |
| 2085388 | 4/1982 | United Kingdom | 406/14 |
| 698870 | 11/1979 | U.S.S.R. | 406/95 |

Primary Examiner—Jeffrey V. Nase
Attorney, Agent, or Firm—Spencer & Frank

[57] ABSTRACT

Process and apparatus for pneumatic or hydraulic transport of bulk material in a conveying direction through a pipeline by means of over or underpressure, in which components are provided for monitoring the pressure prevailing at a plurality of successive points along the pipeline, providing a plurality of sources of a pure gas or liquid each at a pressure corresponding to the pressure prevailing at an associated point along the pipeline, and supplying the pure gas or liquid from each source to the point along the pipeline which succeeds, in the conveying direction, the associated point for that source, while preventing any fluid flow from the pipeline to each source.

6 Claims, 6 Drawing Figures

PROCESS AND EQUIPMENT FOR PNEUMATIC AND HYDRAULIC TRANSPORT OF BULK MATERIALS THROUGH PIPES

This application is a continuation of application Ser. No. 781,135, filed Sept. 27, 1985, now abandoned.

The invention refers to a process or device with the aid of which the formation of plugs during pneumatic or hydraulic transport of dust, powdery or pellet form bulk materials through pipes may be avoided or plugs which have already formed may be removed.

Pneumatic or hydraulic conveying systems operate all the more economically, as is known, the larger the amount of material is transported by a certain amount of gas or liquid. Due to the fact that wear on the pipe and the transported material particles may be reduced considerably with decreasing transport velocity, low gas or liquid velocities in the pipe are strived for. Furthermore the formation of wall deposits and caking of the bulk material on the pipe wall during the transportation of adhesive, fine bulk materials can be reduced especially in pneumatic conveying pipes at decreasing gas velocities.

The reduction of the gas or liquid velocity and the increase of the solid to fluid ratio of the transport fluid in practice is limited because at too low flow velocities a part of the bulk material settles on the pipe bottom, forming strands and dunes moving forwards gradually and discontinuously. When these material accumulations meet together, solid plugs may then be formed which could block the transport pipe at any time.

Various processes and devices have become known for the prevention of plug formation, in the case of which additional gas or additional liquid is supplied to the conveying pipe at several consecutive points via an accompanying pipe situated either inside or outside.

Processes and devices of this type are described in German Pat. No. 449,393 and Federal Republic of Germany Published applications Nos. 1,191,741 and 2,022,962.

All these processes have the disadvantage that the amount of gas or liquid and therefore the flow velocity in the conveying pipe increases with an increasing transport distance, which finally leads to uneconomical conveying with corresponding wear on pipe and particles, and in the case of adhesive materials to the formation of increasing wall deposits.

In the case of another process which is described in the Federal Republic of Germany Pat. No. 1174256, branches running parallel to the pipe are led out of the pipe and then in again at consecutive intervals. This means that the pure fluid, after formation of a longer material plug, is taken from the upstream positioned beginning of the plug, fed into it, thereby splitting the plug into shorter sections. Due to the fact that the bypass line has a considerably smaller diameter than the conveying pipe, very high flow velocities occur in the bypass line during the "plug diversion", which mean increased wear on the bypass line and the transported particles. During transport of adhesive materials the bypass line itself becomes blocked, whereby it has no effect at all.

In the case of another device according to Federal Republic of Germany Pat. Nos. 2550164 and 2305030 forming material plugs are localized during pneumatic transport by the pressure drop in the conveying pipe and removed by supply of additional gas into the pipe section threatened by plugging.

Therefore a pure gas transporting bypass line is connected with the conveying pipe via many non-return valves operating in the direction of the conveying pipe only and via separate or in combination with the non-return valves operating closing valves whereby the latter effect the gas supply into the pipe section threatened by plug formation.

With the aid of this device the required gas flow for pneumatic transport may often be reduced to less than 50% in comparison to a conventional conveying system. In order to remove a forming plug speedily and effectively a minimum amount of gas must be supplied to the relevant pipe section via the non-return valves. As the flow resistance of the bypass line increases with increasing pipe length, the flow rate of gas flowing through the bypass pipe decreases with increasing conveying distance. The bypass line should therefore not be much longer than 100 to 150 m in practice, otherwise the required minimum flow rate of gas necessary for dispersal of the plug is not able to flow into the downstream situated end of the conveying pipe.

A further disadvantage of the process described is that the function of the complete system depends on the perfect function of each individual closing valve through which gas flows consecutively. If one of these valves should cease to function the result is loss of the upstream or downstream neighbouring section of the bypass line, depending on the momentary position of the defective valve, which is normally connected with a blockage of the relevant conveying pipe section.

If material should enter into the bypass pipe from the conveying pipe due to one defective overflow or closing valve, then all valves situated behind downstream are impaired in their function, which results in a reduction of the transported material capacity or in a plug in the conveying pipe. In this case all valves through which material has passed must be removed and individually dismantled and cleaned. This is a particular disadvantage, because due to this the conveying system may have to be shutdown for a considerable period of time.

Especially in the case of long conveying pipes which are operated with low gas velocities it may occur that two or more plugs form in different sections simultaneously. Then, according to the nature of the process described, bypass air is only supplied to the plug which is forming furthest downstream. Due to this compact plugs could in the meantime form in the previous upstream situated conveying pipe section. The removal of these plugs against the flow direction may only be carried out when all downstream obstructions behind it have been removed. As, however, the removal of compact plugs requires periods of up to several minutes, bulk material transport is, undesirably, interrupted for this period.

The plug sections which were split into parts with the aid of the bypass air often move like bullets at high velocities through the conveying pipe, due to the compressed gas situated upstream, which means increased wear on the conveying pipe and the fitted valves when abrasive substances are being conveyed. In the case of fragile materials which are sensitive to abrasion this can mean increased damage to the individual particles.

The invention is therefore based on the task to avoid these disadvantages, especially the formation of one or several plugs in pneumatic or hydraulic conveying lines in sections and to recognize these independently of one another and to remove them independent on one of one another. The equipment required for the realization should also be designed in such a way that in the case of shutdown in a limited conveying pipe section, the function of the devices situated upstream and downstream before and after is not impaired.

The solution to this problem is shown in the designated part of the patent claim 1. An appertaining device as well as a pressure control device are shown in the claims 3 and 4. Further sub-claims are concerned with advantageous design forms. In the diagrams the process according to the invention is demonstrated by simple illustrative descriptions and the device according to the invention required for carrying out the process shown diagrammatically and illustrated in more detail in the following description quoting further advantages.

It may be seen in

Figures 3, 4:
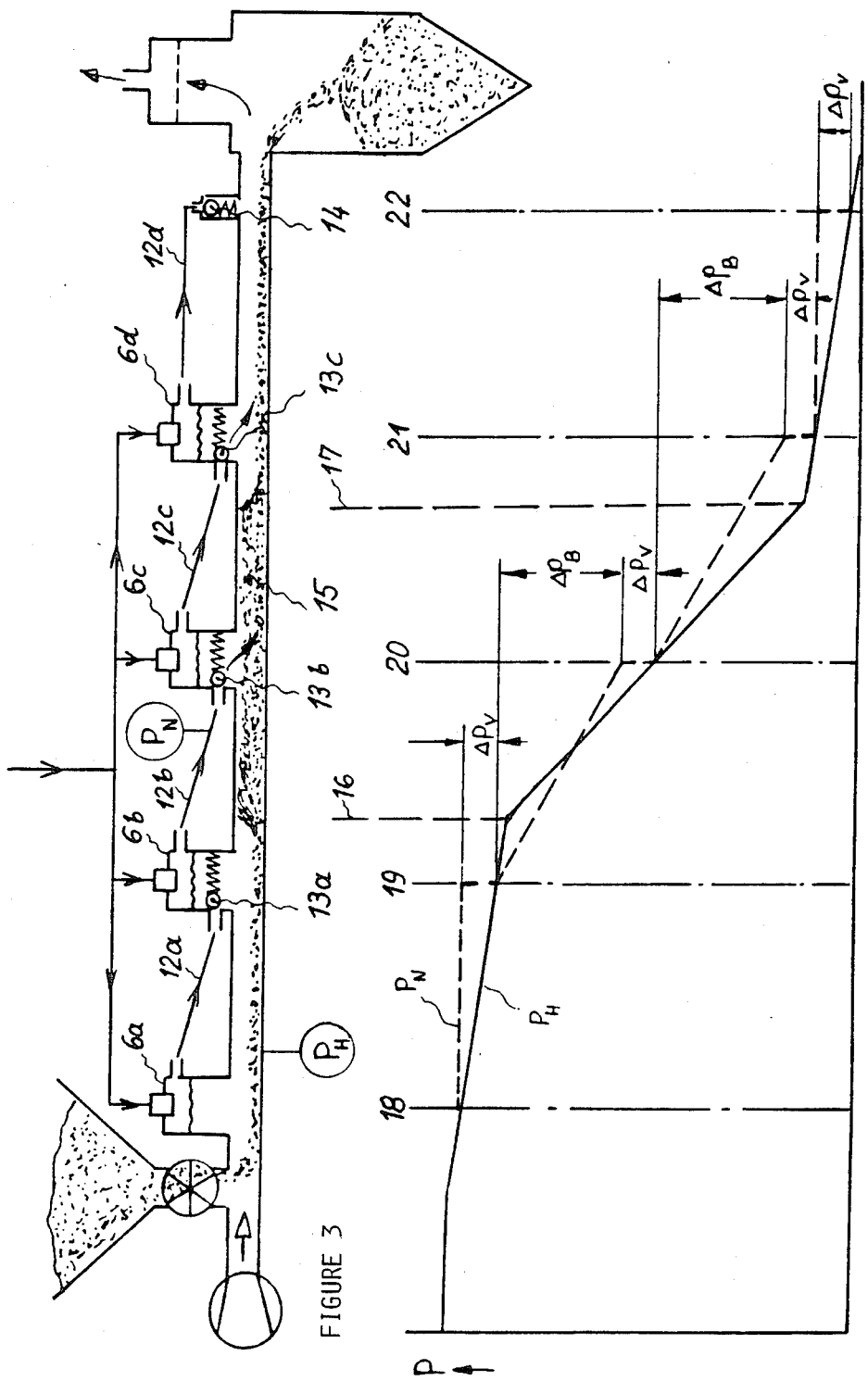
Figure 5:
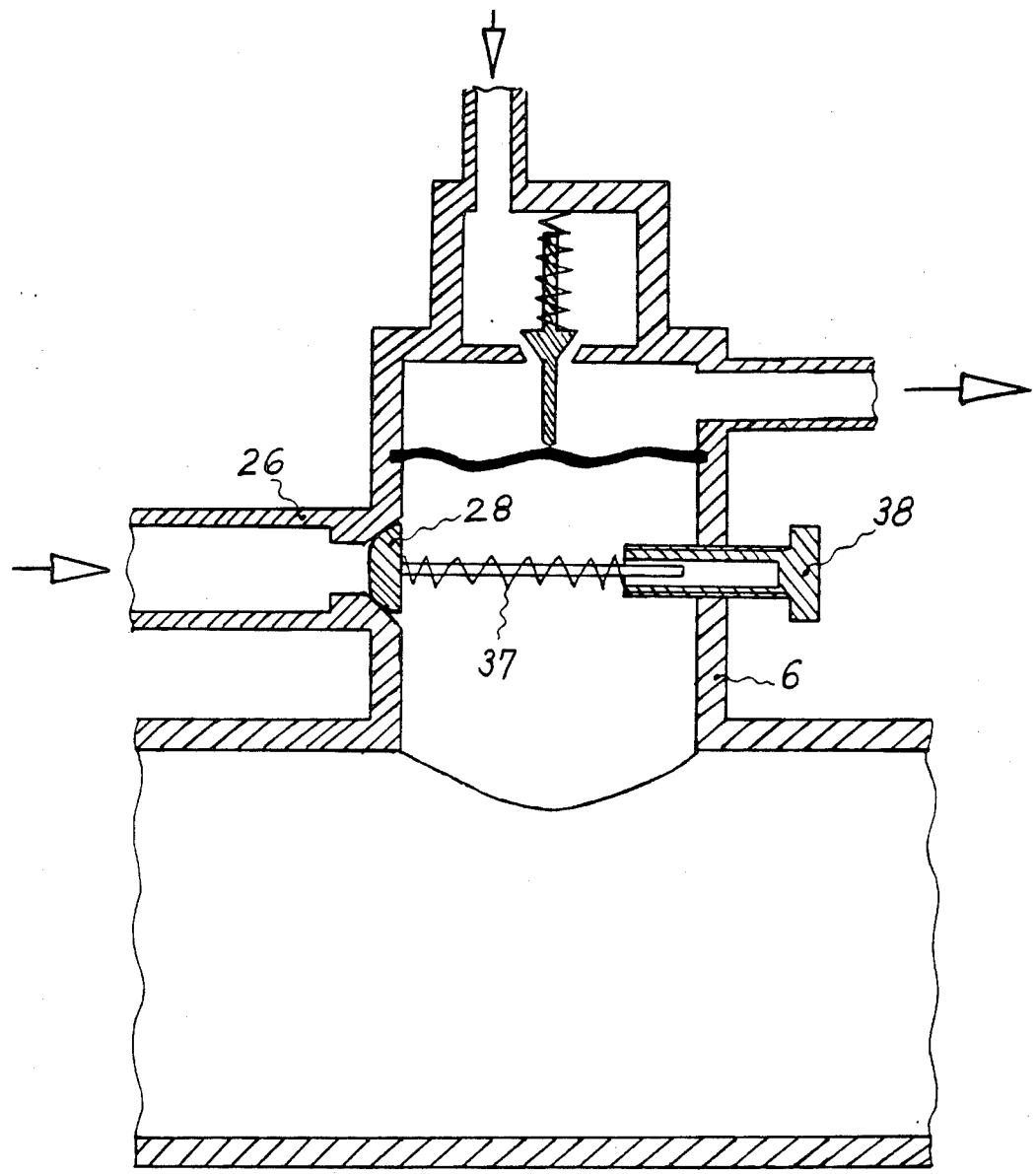
Figure 6:
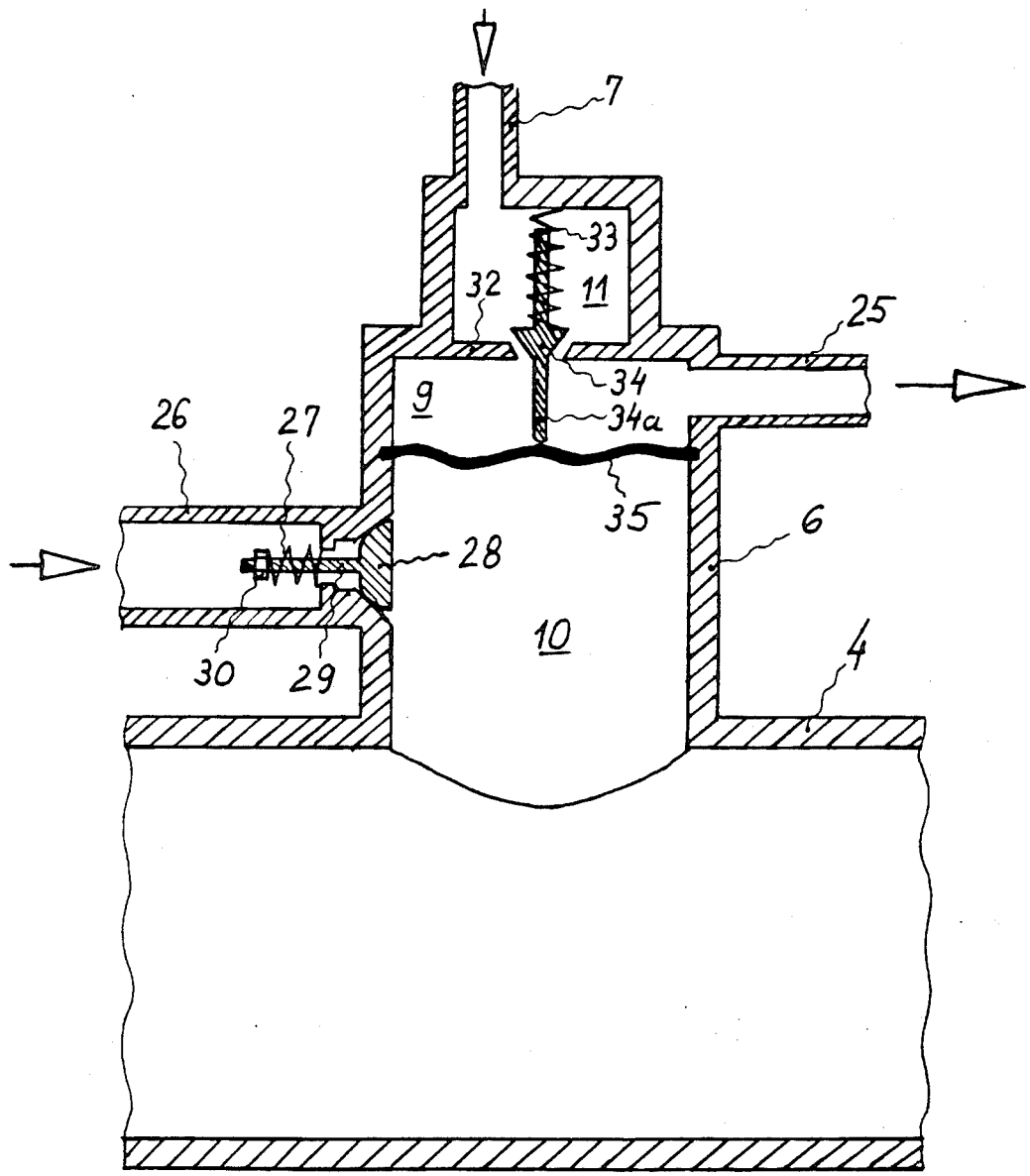

FIG. 1 the complete equipment according to the invention for bulk material transport without plug formation, FIG. 2 the pressure drop throughout the length of the conveying pipe in the situation according to FIG. 1, FIG. 3 the complete equipment according to the invention in the case of formation of a material plug, FIG. 4 the pressure drop throughout the length of the conveying pipe according to FIG. 3, FIG. 5 schematic representation of a valve and pressure regulation device for carrying out the process according to the invention, FIG. 6 a further advantageous design of the valve and pressure control device.

In FIG. 1 the material to be conveyed (1) is supplied e.g. from a storage bin (2) with the aid of a metering unit (3) into the conveying line (4) through which gas or liquid flows, and discharged at its end in the receiving hopper (5). Various pressure control devices (6a, 6b, 6c, 6d) are mounted on the conveying pipe, the spacing of which complies to approx. five or fifty times the conveying pipe diameter. The control devices (6a to 6d) are supplied with pure gas or pure liquid from the pipes (7b, 7c, 7d and 7e) via associated chambers (11a, 11b, 11c, 11d), whereby the pressure in these pipes is higher than the highest pressure in the conveying pipe (4). The pressure control devices (6a to 6d) are divided by a rigid or elastic dividing wall (8a to 8d) into two chambers each (9a to 9d and 10a to 10d). The control devices (6a to 6d) cause the same pressure to prevail at all times in the chambers 9a and 10a, 9b and 10b, 9c and 10c, 9d and 10d etc. The pure gas or pure liquid situated in the chambers (9a to 9d) may flow downstream into the conveying pipe (4) via the bypass pipes (12a to 12d). The non-return valves (13a, 13b, 13c and 14) prevent entry of the solid/gas or solid/liquid suspension into the chambers through which pure fluid flows (9a to 9d). The adjustable closing force of the non-return valves (13a, 13b, 13c and 14) is determined in such a way that these only permit flow from the bypass lines (12a to 12d) into the chambers (10b to 10d) or into the inside of the conveying pipe (4) at a certain set pressure difference $P_v$. In FIG. 1 and in the following case the prevailing pressure in the conveying pipe (4) is denoted by $P_H$ and the prevailing pressure in the bypass line by $P_N$.

In FIG. 2 the pressure drop $P_H$ is plotted for the instance of uniform material concentration at all points throughout the complete pipe length. The pressure control devices (6a to 6d) have the effect that a pressure $P_N$ is reached in the upstream situated ends of the bypass lines which is identical to the respective pressure $P_H$ in the conveying pipe (4). The closing force of the non-return valves (13a to 13c and 14) is set in such a way that it may just not yet be overcome by the pressure difference $P_v$ between two respective neighbouring pressure control devices (6a to 6d) during the material transport shown here with constant material concentration throughout the whole length of the conveying pipe. In this way flow of pure fluid from the bypass lines (12a to 12d) into the conveying pipe (4) during "uninterrupted" pneumatic or hydraulic transport is avoided.

FIG. 3 shows conveying equipment according to the invention during formation of a plug (15) between the points denoted by (16) and (17) in the conveying pipe (4). The region of the beginning plug is in the diagram according to FIG. 4 marked by a steeper pressure drop $P_H$ in the conveying pipe (4) due to a local higher material concentration. Upstream and downstream of the point threatened by the blockage the same pressure drop $P_H$ prevails in the conveying pipe (4) as shown in FIG. 2. The pressure control devices (6a to 6d) have the effect that a pressure $P_N$ is reached in the bypass pipe sections (12a to 12d) in the upstream ends at the points (18) to (21), which is identical to the pressure $P_H$ situated below in the conveying pipe. At the upstream situated ends of the bypass sections (12a to 12d) a pressure must be reached in the bypass pipe which complies with the pressure $P_H$ increased by the closing pressure $\Delta P_v$ of the non-return valves (13a to 13c and 14) in the main pipe.

In the example according to FIG. 4 the closing pressure $\Delta P_v$ of the non-return valves now prevents flow of pure liquid at the points (19) and (22) from the bypass lines (12a and 12d) into the conveying pipe (4).

At the points (20) and (21), however, the available pressure difference between the points (19) and (20) or between (20) and (21) is larger than the pressure difference $\Delta P_v$ required to open the non-return valves (13b and 13c). The differential pressure $\Delta P_B$ is now available to allow flow of pure fluid at the points (20) and (21) from the bypass pipe sections into the conveying pipe (4) in order to disperse the forming plug.

In the example according to FIG. 3 it is especially advantageous that apart from the supply of pure fluid into the forming plug below the pressure control device (6c), additional fluid is fed into the conveying pipe (4) below the control device (6d) situated downstream behind the forming plug. In this way the excessive local material concentration which moves downstream is reduced speedily, so that the transport condition shown in FIG. 1 is reached very rapidly.

With the aid of the process according to the invention and the apparatus required for its execution, not only forming plugs may be recognized and dispersed promptly, but it is also possible to remove formed stubborn plugs in the way described without any outside intervention.

Such blockages can for example occur after decrease of the liquid or gas flow effecting the transport process, or in the case of a brief excessive material supply.

A further advantage may also be seen in the fact that several plugs forming at the same time at different parts of the conveying pipe may be removed independantly of one another and simultaneously. Even if one of the many pressure control devices should cease to function, all the others are not impaired in any way.

FIG. 5 shows an expedient design form of one of the pressure control devices (6a to 6d) in longitudinal section. The casing (6) is either connected firmly to or is detachable from the conveying pipe (4). The nozzle (25) discharges into one, in FIGS. 1 and 3 into those bypass sections denoted as (12a) to (12d). The nozzle (26) is connected with the downstream situated end of one of the bypass sections (12a) to (12c) and is closed by a non-return valve (28), tensioned by the spring (27), whereby the tension force of the spring (27) may be adjusted for example by a thread on the valve shaft (29) and a setting nut (30).

Within the valve casing (6) a chamber is situated (11), into which pure gas or liquid is fed via the nozzle (7). The dividing wall between the chambers (11) and (9) is closed in the idle position by a valve body (34) which is tensioned by a spring (33), the bottom end of which (34a) may be moved against the force of the spring (33) by an elastic diaphragm (35).

In the idle position it is not possible for gas or liquid to flow from the chamber (11) into the chamber (9). If pressure is exerted on the diaphragm (35) via the chamber (10) from the direction of the conveying pipe (4), the diaphragm (35) moves in the direction of the chamber (9) and presses the valve body (34) against the force of the spring (33), so that gas or liquid from the chamber (11) may flow into the chamber (9) and therefore in the direction of the nozzle (25). If the same pressures prevail in the chambers (9) and (10), the opening in the dividing wall (32) between the chambers (11) and (9) is reclosed by the valve body and therefore gas flow from the chamber (11) into the chamber (9) is stopped.

FIG. 6 shows a further form of the pressure control device according to the invention in combination with a non-return valve (28) mounted in the nozzle (26), the closing force of which may be adjusted via a spring (37) and a setting screw (38) outside of the casing (6).

I claim:

1. Process for pneumatic or hydraulic transport of bulk material in a conveying direction through a pipeline by means of over or underpressure, with a normal pressure drop existing in the pipeline when no plug of bulk material exists in the pipeline, comprising: monitoring the pressure prevailing at a plurality of successive selected points along the pipeline; continuously providing a plurality of sources of a pure gas or liquid each at a pressure corresponding to the pressure prevailing at an associated one of the selected points along the pipeline; and supplying the pure gas or liquid from each source to the selected point along the pipeline which next succeeds, in the conveying direction, the associated selected point for that source, only when the pressure drop in the pipeline between the selected point associated with that source and the succeeding selected point exceeds the normal pressure drop.

2. Process as defined in claim 1 wherein said step of supplying from each source is carried out in opposition to a flow resistance which corresponds to the normal pressure drop between two succeeding selected points and which must be overcome before the pure gas or liquid can enter the pipeline.

3. Apparatus for pneumatic or hydraulic transport of bulk material in a conveying direction through a pipeline, with a normal pressure drop existing in the pipeline when no plug of bulk material exists in the pipeline, comprising:

a plurality of pressure control devices each situated on the pipeline at a respective one of a plurality of successive selected points along the pipeline;

means including a plurality of supply pipes connected to said devices for individually supplying a pure fluid to each said device;

a plurality of bypass pipes each having an inlet end connected to a respective device for receiving pure fluid supplied to the respective device and an outlet end connected to the pipeline at the selected point along the pipeline which next succeeds, in the conveying direction, the selected point at which said respective device is situated; and means connected to the outlet end of each bypass pipe for permitting pure fluid flow in a respective bypass pipe only when the pressure drop in the pipeline between the selected point at which is situated the pressure control device connected to the inlet end of the respective bypass pipe and the selected point at which is connected the outlet end of the respective bypass pipe exceeds the normal pressure drop.

4. Apparatus as defined in claim 3 wherein each said pressure control device comprises: a casing having a hollow interior; a diaphragm disposed in said casing and dividing the hollow interior into a first chamber communicating with the pipeline and a second chamber communicating with the bypass pipe inlet end connected to said device, said casing having an aperture for permitting pure fluid supplied to said device to flow into said second chamber; valve means disposed in said aperture and operatively associated with said diaphragm for closing said aperture when the pressures in said chambers are equal and opening said aperture when the pressure in said first chamber is greater than the pressure in said second chamber.

5. Apparatus as defined in claim 4 wherein said means for permitting pure fluid flow comprise a plurality of non-return valves and each said non-return valve forms a structural and functional unit with that said device which is located at the selected point where the bypass pipe outlet end connected to that said non-return valve is connected.

6. Apparatus as defined in claim 4 wherein at least one said non-return valve is directly connected to the pipeline.

* * * * *